US008626789B2

(12) United States Patent
Jayanti et al.

(10) Patent No.: US 8,626,789 B2
(45) Date of Patent: Jan. 7, 2014

(54) GEOCODING USING INFORMATION RETRIEVAL

(75) Inventors: Harish Jayanti, Redmond, WA (US); Eugene Shinn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 11/756,775

(22) Filed: Jun. 1, 2007

(65) Prior Publication Data

US 2008/0301092 A1 Dec. 4, 2008

(51) Int. Cl.
*G06F 17/30* (2006.01)

(52) U.S. Cl.
USPC ........... 707/771; 707/723; 707/761; 707/764; 707/E17.017

(58) Field of Classification Search
USPC .................................................. 707/705–780
See application file for complete search history.

(56) References Cited

U.S. PATENT DOCUMENTS

| | | | |
|---|---|---|---|
| 6,343,290 B1 | 1/2002 | Cossins et al. | |
| 6,732,120 B1 * | 5/2004 | Du ................ | 715/764 |
| 6,981,001 B1 | 12/2005 | Reddick et al. | |
| 6,993,718 B2 | 1/2006 | Fujihara | |
| 7,036,940 B2 * | 5/2006 | Matsuda et al. ............... | 353/70 |
| 7,039,640 B2 | 5/2006 | Miller et al. | |
| 7,092,957 B2 | 8/2006 | Klein | |
| 7,158,878 B2 | 1/2007 | Rasmussen et al. | |
| 7,231,405 B2 * | 6/2007 | Xia ........................... | 1/1 |
| 7,324,987 B2 * | 1/2008 | Hsieh et al. .................. | 1/1 |
| 7,376,636 B1 * | 5/2008 | Wang et al. ................ | 707/694 |
| 7,483,881 B2 * | 1/2009 | Egnor et al. ............... | 1/1 |
| 7,660,784 B1 * | 2/2010 | Virdy et al. ............ | 707/999.003 |
| 7,702,681 B2 * | 4/2010 | Brewer et al. ................ | 707/748 |
| 7,707,140 B2 * | 4/2010 | Leishman et al. .................... | 1/1 |
| 7,788,252 B2 * | 8/2010 | Delli Santi et al. ............ | 707/708 |
| 7,822,751 B2 * | 10/2010 | O'Clair et al. ............... | 707/748 |
| 7,860,852 B2 * | 12/2010 | Brunner et al. .............. | 707/706 |
| 7,933,897 B2 * | 4/2011 | Jones et al. .................... | 707/723 |
| 2002/0019699 A1 | 2/2002 | McCarty et al. | |
| 2002/0054082 A1 | 5/2002 | Karpf | |
| 2002/0055924 A1 | 5/2002 | Liming | |
| 2002/0087525 A1 * | 7/2002 | Abbott et al. .................... | 707/3 |
| 2002/0145620 A1 | 10/2002 | Smith et al. | |
| 2005/0034074 A1 | 2/2005 | Munson et al. | |
| 2006/0041573 A1 * | 2/2006 | Miller et al. .................. | 707/101 |
| 2006/0085396 A1 | 4/2006 | Evans et al. | |
| 2006/0245572 A1 | 11/2006 | Asher et al. | |
| 2007/0136320 A1 * | 6/2007 | Sah et al. ........................ | 707/100 |
| 2007/0198495 A1 * | 8/2007 | Buron et al. ...................... | 707/3 |

OTHER PUBLICATIONS

"Google Earth", available at least as early as May 1, 2007, at <<http://earth.google.com/earth.html>>, Google, 2006, pp. 1-3.

(Continued)

*Primary Examiner* — Fred I Ehichioya
*Assistant Examiner* — Michelle Owyang

(57) ABSTRACT

Geocoding architecture based on information retrieval. The geocoding information retrieval system operates on locations and geographic entities. The architecture uses parameters in addition to the query string, if available. The parameters provide contextual information that enables filtering and sorting the results. The additional parameters include market, culture, map view, and user location. A geocoding triage process uses the query and context information provided and output of a machine-learning parser to select the data-lookup geocoders for processing the query. A results processing component collects the results from the underlying data-lookup geocoders, merges the results into a single list after normalizing the scores, and then re-sorts the results list.

13 Claims, 12 Drawing Sheets

(56) References Cited

OTHER PUBLICATIONS

Purves et. al., "Identifying Imprecise Regions for Geographic Information Retrieval Using the Web", 2005, pp. 4.

Schockaert et. al., "Towards Fuzzy Spatial Reasoning in Geographic IR Systems", pp. 3.

Jones et. et., "Spatial Information Retrieval and Geographical Ontologies an Overview of the SPIRIT Project", SIGIR,, Aug. 11-15, 2002, ACM, pp. 2.

* cited by examiner

GEOCODING USING INFORMATION RETRIEVAL

BACKGROUND

The Internet has made possible access to a wide variety of data and services. Websites entice users to take advantage of free services as a way of exposing the user to advertisements, which in turn, provide revenue to the host vendor. One example includes the free access and use of online mapping services for geographic locations. Such services are used extensively not only for online access but also for paid services in vehicles, for example.

Geocoding is the process of assigning geographic identifiers such as coordinates to map features such as addresses, places, and other structures by way of software called a geocoder. This applies not only to addresses and places, but also to events or data that have a geographic component.

Typically, conventional geocoding systems are based more on data retrieval techniques rather than information retrieval. A data retrieval system strives to retrieve all objects that satisfy clearly defined conditions such as in a regular expression or in a relational algebra expression. Data retrieval deals with data that has a well defined structure and semantics. In contrast, an information retrieval system usually deals with natural language text that is not always well structured and can be semantically ambiguous. To be effective, the information retrieval system must interpret the query to determine the user intent, which requires extraction of semantic and syntactic information, and then use this information to find relevant documents. The notion of relevance is central to information retrieval systems. Accordingly, the goal of the information retrieval system is to retrieve all documents which are relevant to a user query, while retrieving as few non-relevant documents as possible.

The user interface for geocoding usually consists of separate fields of an address (e.g., address line, city, state, postal code, country, etc.). The values in these fields are usually used by a geocoder to perform hierarchical data lookups in order to obtain the potential matches. However, when given a single-line address that has the fields concatenated together, conventional geocoders perform poorly in that parsing of the string into individual fields is inaccurate. Some of the key problems include incorrect and optional usage of separators, various permutations of the individual fields, and missing fields. Parsing generally tends to be code-driven, rather than data-driven based on real-world logs, and follows a single code path to extract the individual fields. These fields are then sent to a geocoding data lookup engine to obtain the matches and return the matches back to the caller. The success of this approach is limited to well-formatted addresses that have all the individual fields, but tends to break down when there is an ambiguity or missing information in the query.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed embodiments employ an information retrieval approach for geocoding rather than a traditional data-lookup approach. This supports a more generic search system that gives the user the best answers possible (e.g., what/where, driving directions, traffic, weather, etc.) for the geographic information system.

The geocoding information retrieval system operates on locations and geographic entities, and uses parameters in addition to the query string, if available. The parameters provide contextual information that enables filtering and sorting of the results. The additional parameters can include market, culture, map view, and user location, for example.

A geocoding triage process uses the query, context information provided, and output of a machine-learning parser to select the data-lookup geocoders for processing the query. A results processing component collects the results from the underlying data-lookup geocoders, merges the results into a single list after normalizing the scores, and then re-sorts the results list.

The machine-learning based parsers are trained using real-world data to parse the query string into individual fields. When there is more than one parse result, the architecture will use the multiple results appropriately. Moreover, since the parsing is data-driven, it is not necessary to write a separate parser for each geographic region, and the parser is self-improving as it can be trained continuously with real world data.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
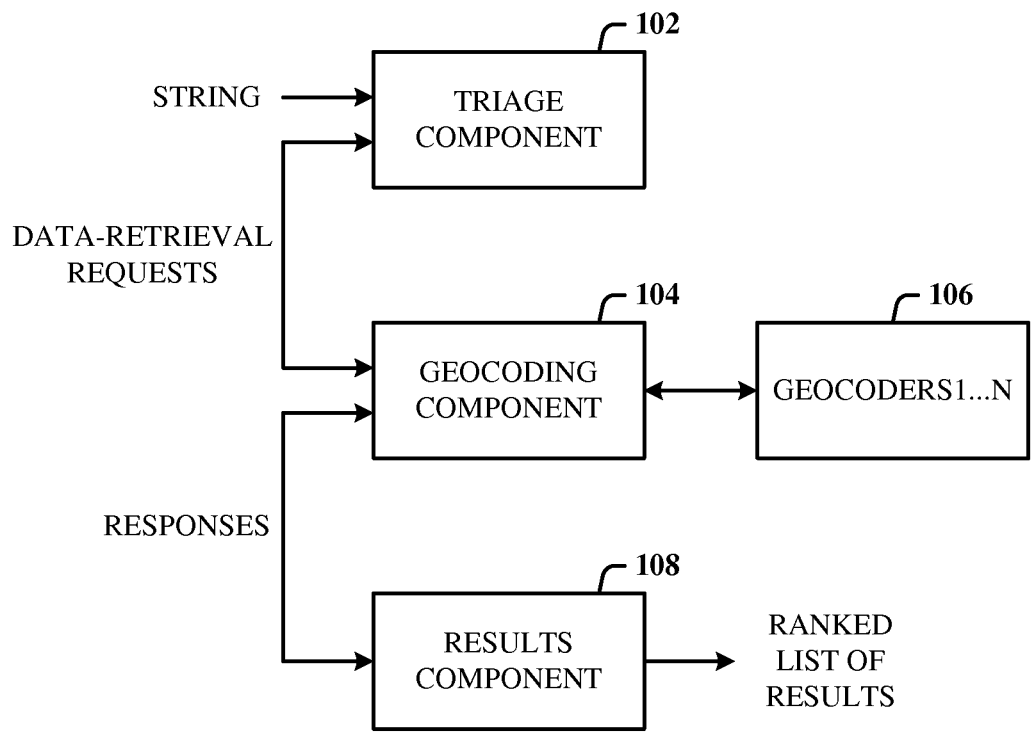
FIG. 1 illustrates a computer-implemented geocoding system.

The disclosed architecture addresses geocoding more as an information retrieval problem rather than a strict data retrieval problem. As compared to traditional information retrieval systems like web search engines that operate on web documents, a geocoding information retrieval system operates on locations and geographic entities.

Instead of taking the query string, performing a single parse on the string, and then conducting a data lookup, the architecture uses a number of additional parameters in addition to the query string, if available. These parameters provide contextual information that enable filtering and sorting the results appropriately. Some of the additional parameters include market, culture, map view, and user location.

In view of the disclosed architecture, geocoders that implement the common geocoder interface provided herein can be deployed by hosting the data and assemblies on a central server and thereby only make small changes to the configuration on the server. This integration process makes deployment of geocoding services for new markets easier. In addition to WS-* (a collection of web service specifications)/SOAP (simple object access protocol) service end points, the geocoding service exposes a number of lighter weight HTTP-based service end points that can output data as old XML (extensible markup language), JSON (JavaScript object notation), and other data formats.

Moreover, users are not required to specify a distinct data source. Internally, geocoding can be segregated by country and/or regions, but the user is not required to manually select a data source. Instead, the service will automatically select the best possibilities based on the information provided as part of a request.

Flexible parsing is provided in that the address parsing solution in the geocoding service does not require perfectly formatted input and does not assume that there is a single best parse. Instead, the geocoding architecture works with the best possibilities available and returns the best results. Intelligent geocoding is provided in that the geocoding service uses contextual information to increase the possibility of success.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented geocoding system 100. A triage component 102 is provided for receiving a query as a string, and parsing the string into a set of data-retrieval requests. A geocoding component 104 federates the data-retrieval requests to data geocoders 106, the responses from which are passed to a results component 108 for processing the responses into a ranked list of results. A subset of the results can then be returned to a client, for example, that initiated the string.

The query received by the triage component 102 can include context information where the context information includes data such as market data, culture data, map view data and user location data. The market and/or culture data indicates the preferred geographic region and language settings. The map view data provides a geographic context of the current user view (e.g., center view, bounding polygon, direction of travel, side of the road, etc.). The user location data is based on the current approximate physical location of the user obtained from Wi-Fi, reverse IP lookup, cell phone data, and GPS (global positioning system), for example.

The string can be received from different entities, but typically will be received from a client. The string can be part of a query of structured information or unstructured information such as natural language text.

Following are sample queries and associated responses. First, a query is provided that includes only the address line, with the map view providing the remaining context. For example, "600 7 ave" is a query, with the current map view indicating the context information as being downtown Seattle. The geocoder will infer the city from the map view and find the exact match of "600 7 Ave, Seattle Wash.".

Second, a query is provided that includes only the address line, with the user location providing the remaining context. For example, "600 7 ave" is a query, with the user currently located somewhere in Seattle (map view can be anywhere). The geocoder will infer the city from the user location and find the match.

Third, is a query "600 7 Ave Seattle Wash." is provided for a user with current map view of India. The geocoder will find the correct location even though the map view and user location were not helpful.

Fourth, an incorrectly formatted query is provided such as "600, 7 Ave Seattle Wash." (e.g., a comma between the house number and street). The parser correctly recognizes "600 7 ave" as the address line and the correct location is found.

As a last example, a query is provided that includes a city having a name that exists in several different states, for example, "Vancouver", with the current map view over SW Washington. The result will sort Vancouver, Washington, higher than Vancouver, British Columbia. However, the sort order can be changed by the user.

Figure 2:
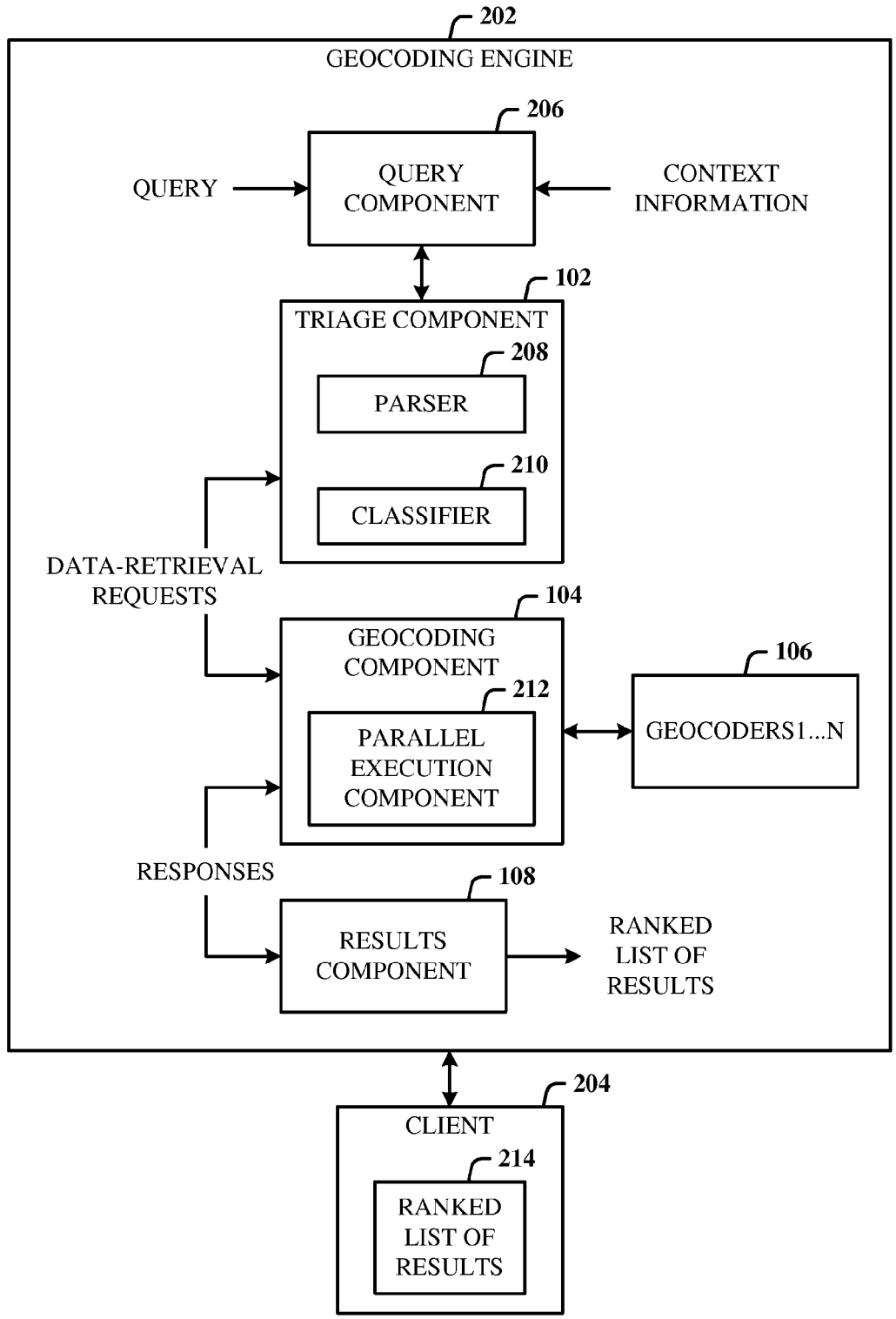
FIG. 2 illustrates an alternative system for geocoding using information retrieval.

FIG. 2 illustrates an alternative system 200 for geocoding using information retrieval. The system 200 includes a geocoding engine 202 that includes the system 100 of FIG. 1 for processing queries from a client 204. The geocoding engine 202 can be a centralized (and distributed) service that the client 204 accesses via a browser, for example. The client 204 issues a query to a query component 206 of the engine 202. The query component 206 receives the query in the form of a string (structured and/or unstructured), adds context information to the query, and forwards the string and context information to the triage component 102 for processing.

The triage component 102 can include a parser 208 that parses the string and context information into parse results. The parser 208 can use a classifier 210 (e.g., machine learning-based) to apply probability and/or statistical-based analysis to learn and reason about string characteristics (e.g., ambiguities, missing information, etc.) and results. The machine-learning based parser 208 can be trained using real-world data to parse the query string into individual fields. There is a high likelihood that there can be more than one parse result. The engine 202 will use the parse results appropriately. Additionally, since the parsing process is data-driven, it is not necessary to write a separate parser for each geographical region. Again, the parser 208 can be self-improving as due to continuous training with the real-world data.

The output of the triage component 102 includes data-retrieval requests that are passed to the geocoding component 104. The triage component 102 uses the query and the context information (e.g., market data, culture data, map view data, and/or user location data) and the output of the parser 208 to select which of the data-lookup geocoders 106 to send the query. The requests can be optimized according to the characteristics of the underlying geocoders 106. In other words, a request sent to a first geocoder could be formatted and/or processed differently than requests sent to a second geocoder.

The geocoding component 104 includes a parallel execution component 212 that federates the data-retrieval requests to the geocoders 106 for substantially concurrent execution. Data from the geocoders 106 is in the form of responses which are passed to the results component 108. Responses that are received within a predefined time period are then processed and the results merged, and the top x results, where x is a positive integer, are selected from the merged list.

The results component 108 generates scores for the results, and the results are ranked based on the scores. The results component 108 normalizes static data-retrieval requests, and generates dynamic scores for the results based on multiple dimensions of relevance using at least one of context, data-retrieval possibilities, the static data-retrieval requests, or user personalization. The final list of ranked results 214 are then communicated to the caller (or client 204) for presentation.

The classifier 210 employs machine learning and reasoning (MLR) which facilitates automating one or more features by updating the parser 208 based on incoming data. The subject architecture (e.g., in connection with parsing) can employ various MLR-based schemes for carrying out various aspects thereof. For example, a process for determining when to define an end of a term in the query can be facilitated via an automatic classifier system and process.

A classifier is a function that maps an input attribute vector, $x=(x_1, x_2, x_3, x_4, \ldots, x_n)$, where n is a positive integer), to a class label class(x). The classifier can also output a confidence that the input belongs to a class, that is, $f(x)$=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

Figure 3:
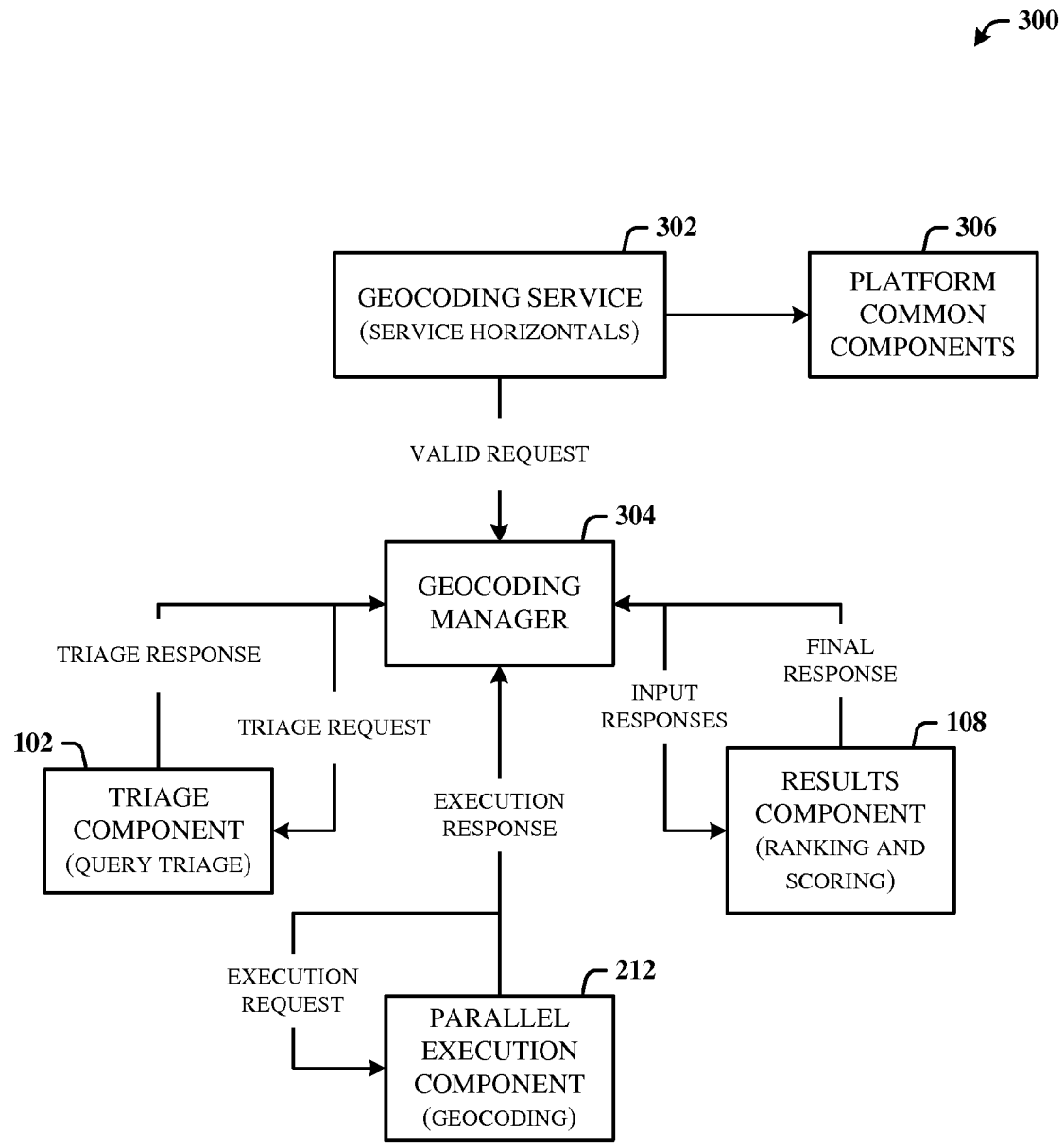
FIG. 3 illustrates an exemplary high-level overview of a geocoding system for geocoding in accordance with the disclosed architecture.

FIG. 3 illustrates an exemplary high-level overview of a geocoding system 300 for geocoding in accordance with the disclosed architecture. The system 300 is composed of two major parts: a geocoding service 302 and the geocoding manager 304. The service 302 handles most of the common tasks required of all services via a platform common component 306, which component 306 provides security, logging and performance.

The service 302 also performs request validation. Once the service 302 has determined the service request is valid (VALID REQUEST), the service 302 hands the request (VALID REQUEST) off to the manager 304. The manager 304 performs at least triage, geocoding, and results management. The manager 304 executes the request (TRIAGE REQUEST) through the triage component 102 to receive a triage response (TRIAGE RESPONSE), and also executes the request (EXECUTION REQUEST) through the parallel execution component 212 for geocoding and return of the data-retrieval possibilities (EXECUTION RESPONSE). The manager 304 aggregates the responses from the triage component 102 and execution component 212, and passes these responses (INPUT RESPONSES) to the results component 108 for grading based on at least ranking and scoring. Data needed for scoring and ranking can be passed along with the input responses to the results component 108. Finally, the results (scored and sorted) are packaged into a single response (FINAL RESPONSE) that is returned to the caller (e.g., a client).

Figure 4:
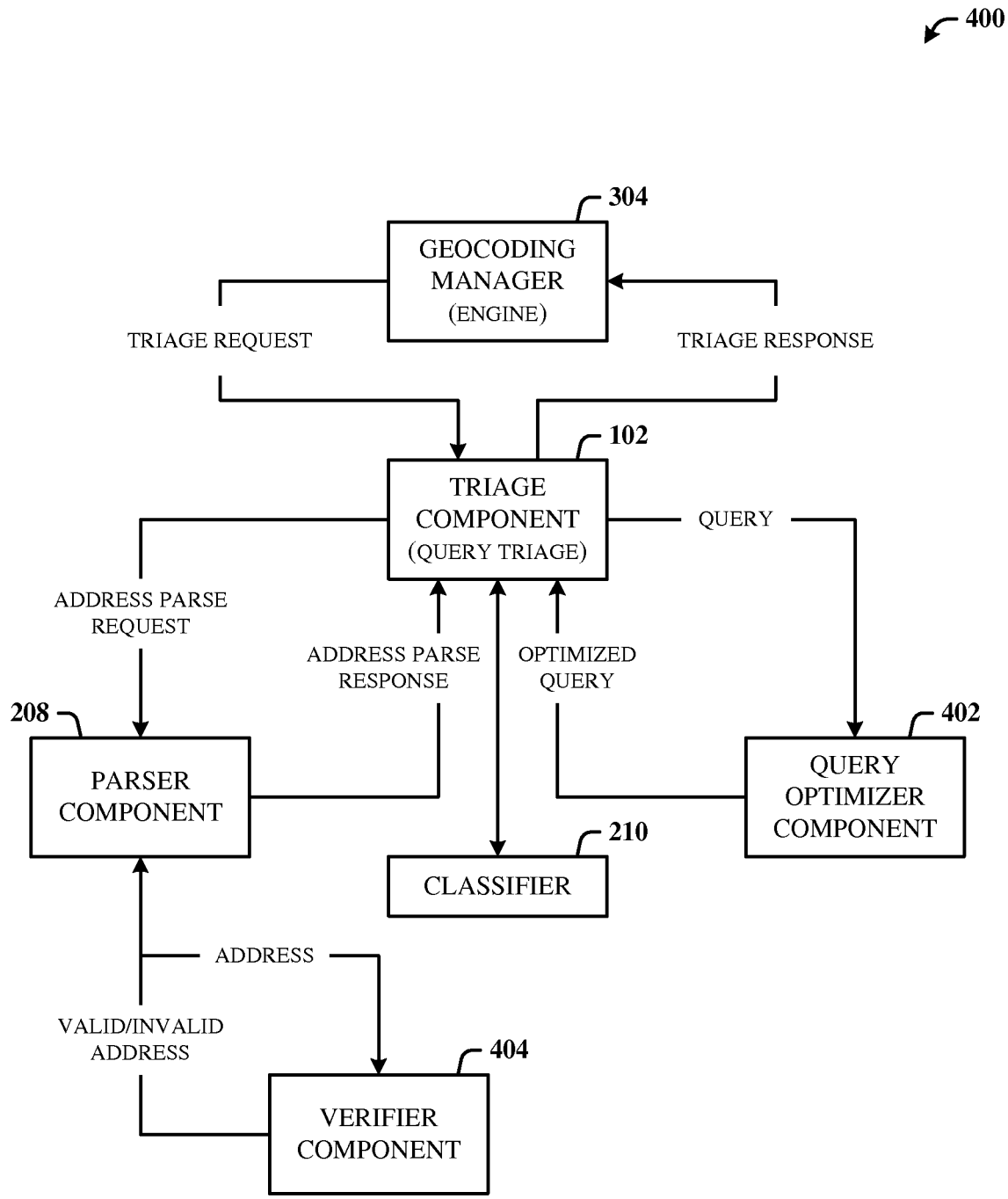
FIG. 4 illustrates a more detailed diagram of aspects associated with the triage component.

FIG. 4 illustrates a more detailed diagram 400 of aspects associated with the triage component 102. Generally, the triage component 102 extracts country and/or region information from the query input (whether an unstructured query string or a structured address) and context information, and inputs the country and/or region information into weighting function (e.g., by request context type) to generate the list of ranked country/region information. Initially, the triage component 102 passes the query (QUERY) to a query optimizer component 402 for processing to generate an optimized query (OPTIMIZED QUERY) for further processing by the triage component 102.

If available for a given country/region, the triage component 102 passes an address parse request (ADDRESS PARSE REQUEST) to the parser component 208 for parsing the scrubbed query into a structured address. The parser 208 performs validation of the address via a verifier component 404. The verifier 404 receives the address, country and/or region, and returns a valid or invalid address response to the parser 208. The parser 208 then sends an address parse response (ADDRESS PARSE RESPONSE) to the triage component 102. The country/regions, and the query or the structured address (if available and considered valid) are used to generate geocoding commands for individual geocoders to consume.

Figure 5:
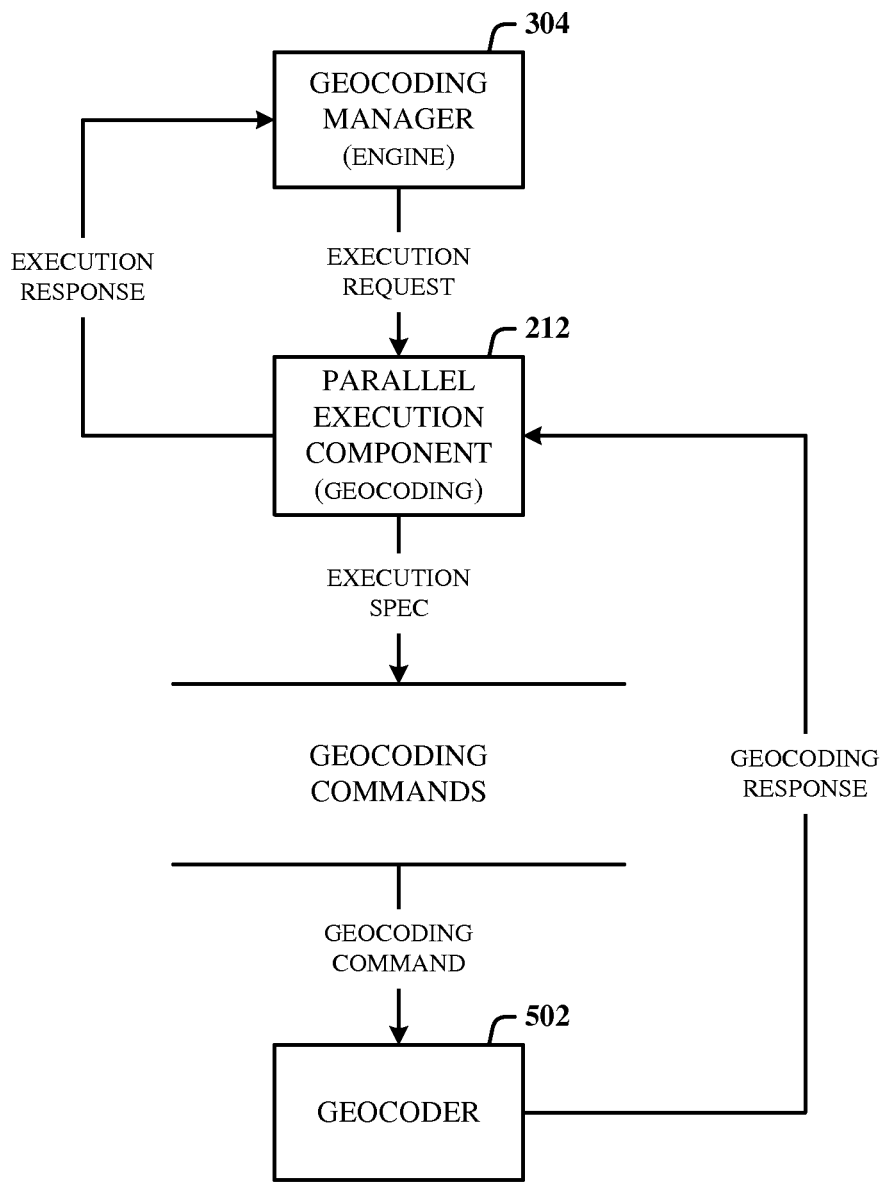
FIG. 5 illustrates a more detailed diagram of aspects associated with the parallel execution for geocoders.

FIG. 5 illustrates a more detailed diagram 500 of aspects associated with the parallel execution for geocoders. The manager 304 sends an execution request to the execution component 212, the request including one or more geocoding commands (received from the query triage process) associated with an implementation of a geocoder 502. In other words, the commands can be different for different geocoders. The execution component 212 executes the commands thereby dispatching multiple geocodes in parallel to one or more geocoder implementations, remote or local. The geocoder 502 returns a response to the execution component 212 within a maximum time set for geocoding. The responses are then returned to the manager 304 in a parallel execution response.

Figure 6:
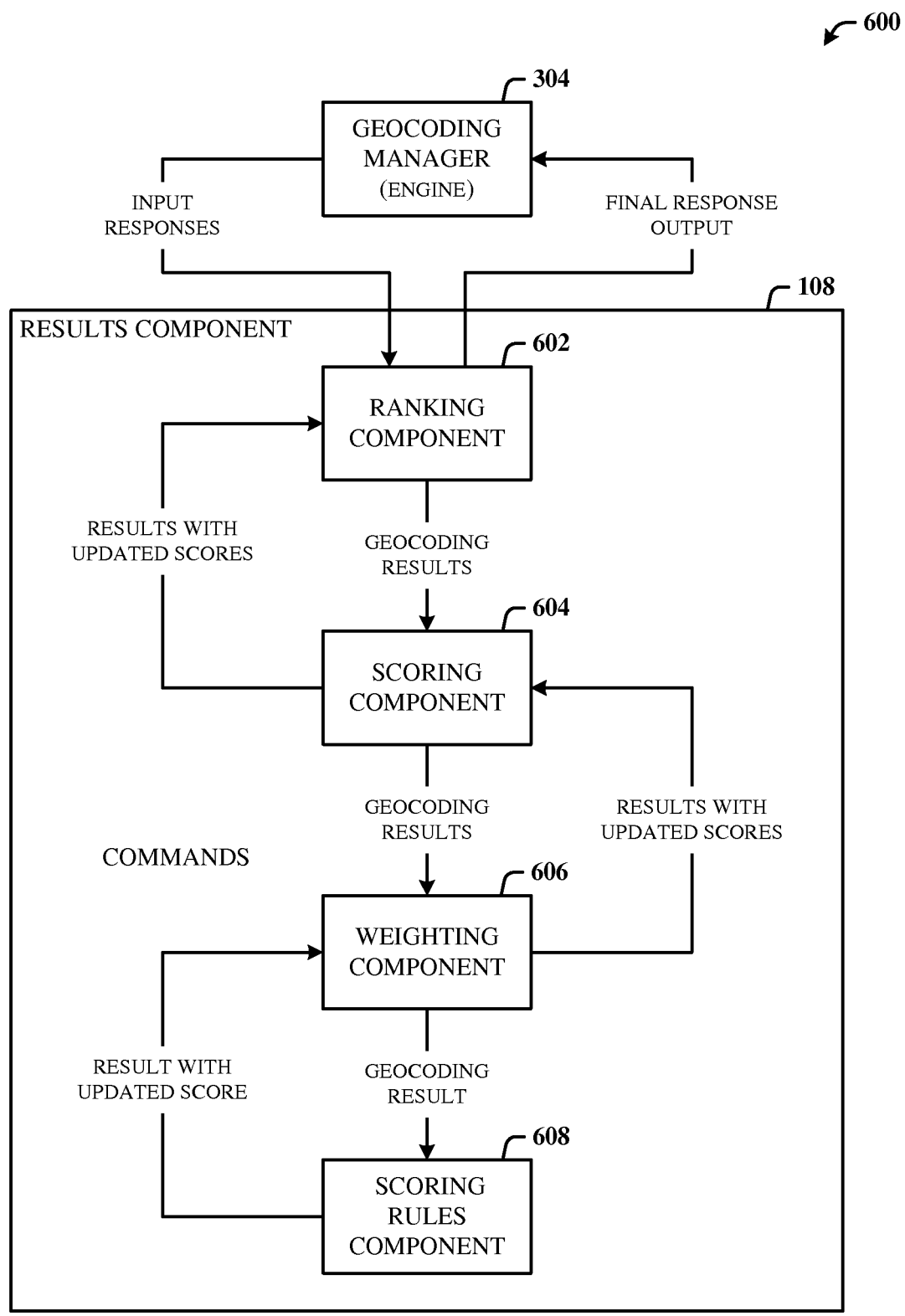
FIG. 6 illustrates a more detailed diagram of aspects associated with results processing.

FIG. 6 illustrates a more detailed diagram 600 of aspects associated with results processing. Results processing by the results component 108 can include scoring, ranking, and weighting based on predetermined rules. The manager 304 passes the input responses (and data needed for scoring and sorting) received from triage and parallel execution to a ranking component 602 for ranking and scoring. The output of the ranking component 602 includes geocoding results and data for rules processing, if needed, which output is passed to a scoring component 604 for results scoring. Similarly, the output of the scoring component 604 includes geocoding results and data for rules processing, if needed, which output is passed to a weighting component 606 for weight assignment to different rules.

Similarly, the output of the weighting component 606 includes geocoding results and data for rules processing, if needed, which output is passed to a scoring rules component 608 for adjusting the result score based on defined logic in the rule. The output of the scoring rules component 608 is a geocoding result with an updated score, which is passed back through the weighting component 606 for updating, through the scoring component 604 for updating, through the ranking component 602 for updating, and then to the manager 304 as a final single response with scored and sorted results.

The ranking component 602 takes the geocoding responses returned from geocoding and scores the results based on various pieces of data available. These pieces of data can include request context, the original input (query or structured address), the results of the query triage process, a geocoding command that returned a given result, and internal rank and score of the geocoder. Different rules (scoring rules) can give a geocoding result a personalized score. These scores can then be aggregated into a composite score that is based on the weights given to various rules. The composite score will then be used to determine which results to return.

Figure 7:
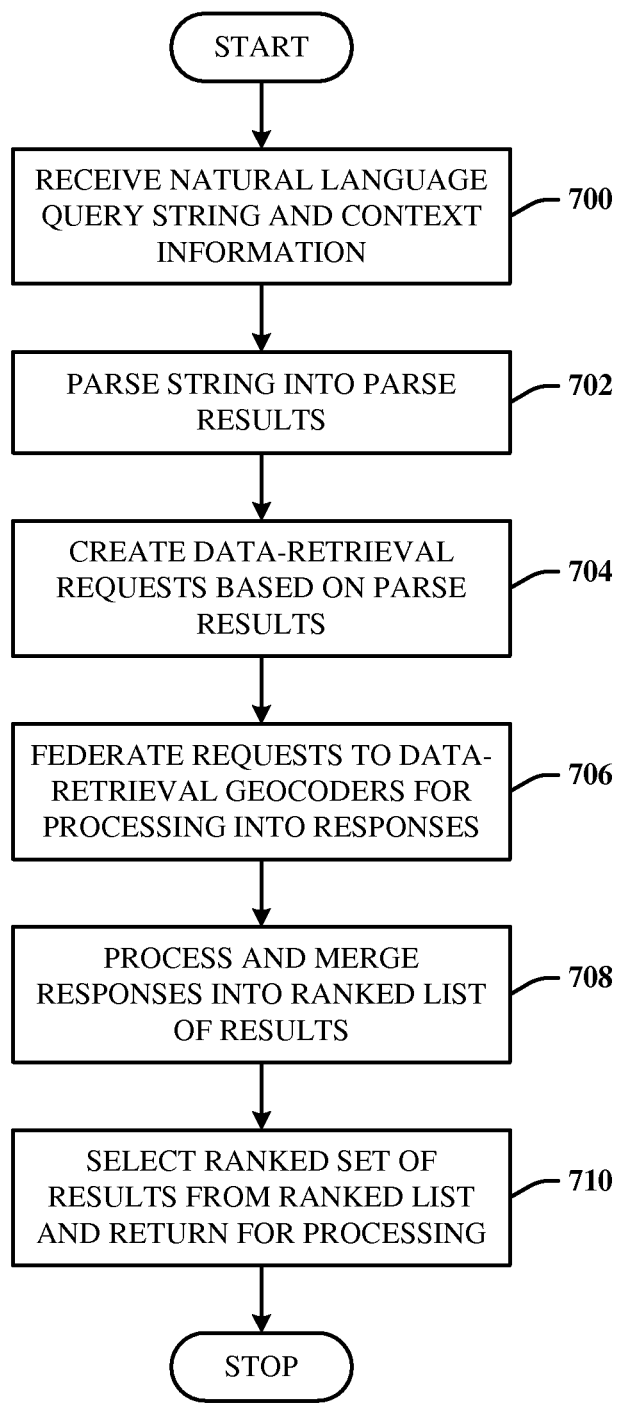
FIG. 7 illustrates a method of geocoding based on data retrieval.

FIG. 7 illustrates a method of geocoding based on data retrieval. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 700, a query string is received accompanied by context information. At 702, the string is parsed into parse results. At 704, data-retrieval requests are created based on the parse results. At 706, the requests are federated to data-lookup geocoders. At 708, responses from the geocoders are merged into a ranked list of results. At 710, a set of results from the ranked list of results is selected and returned for processing. The set of results can be returned to a client, for example.

Figure 8:
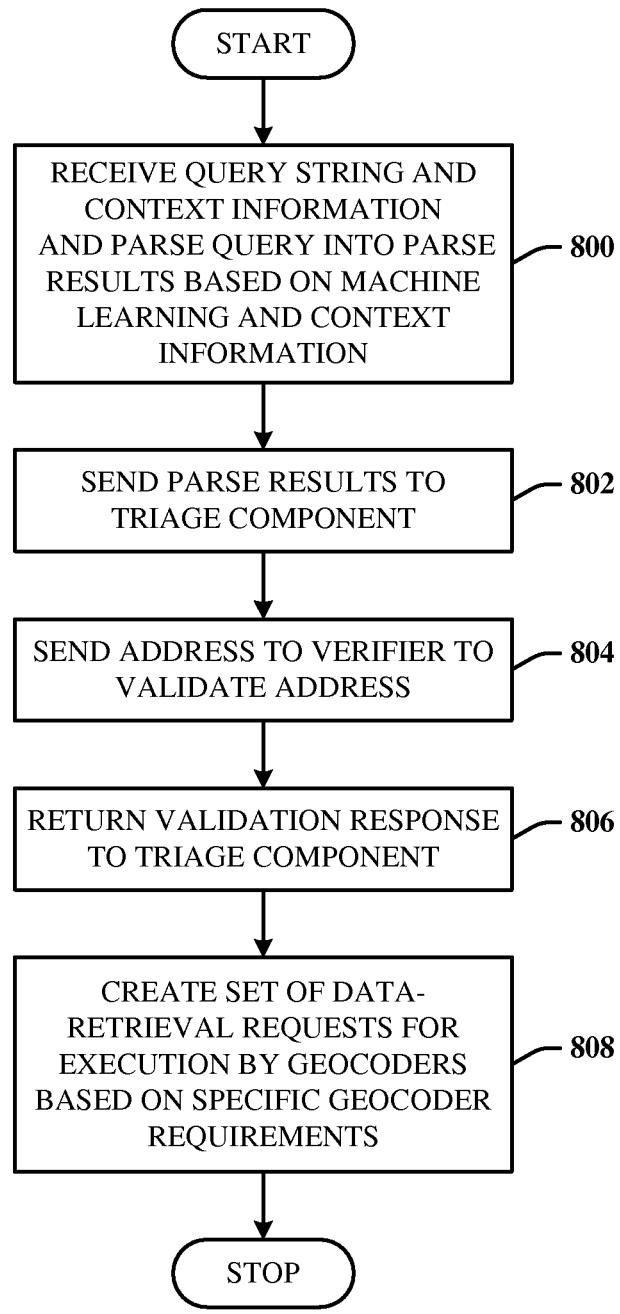
FIG. 8 illustrates a method of query parsing and classification for geocoding.

FIG. 8 illustrates a method of query parsing and classification for geocoding. At 800, a query string and context information are received, the query parsed into parse results based on machine learning and the context information. At 802, the parse results are sent to the triage component. At 804, the address is sent to a verifier to validate the address. At 806, a validation response is returned to the triage component. At 808, a set of data-retrieval requests is created for execution by geocoders based on specific geocoder requirements.

Figure 9:
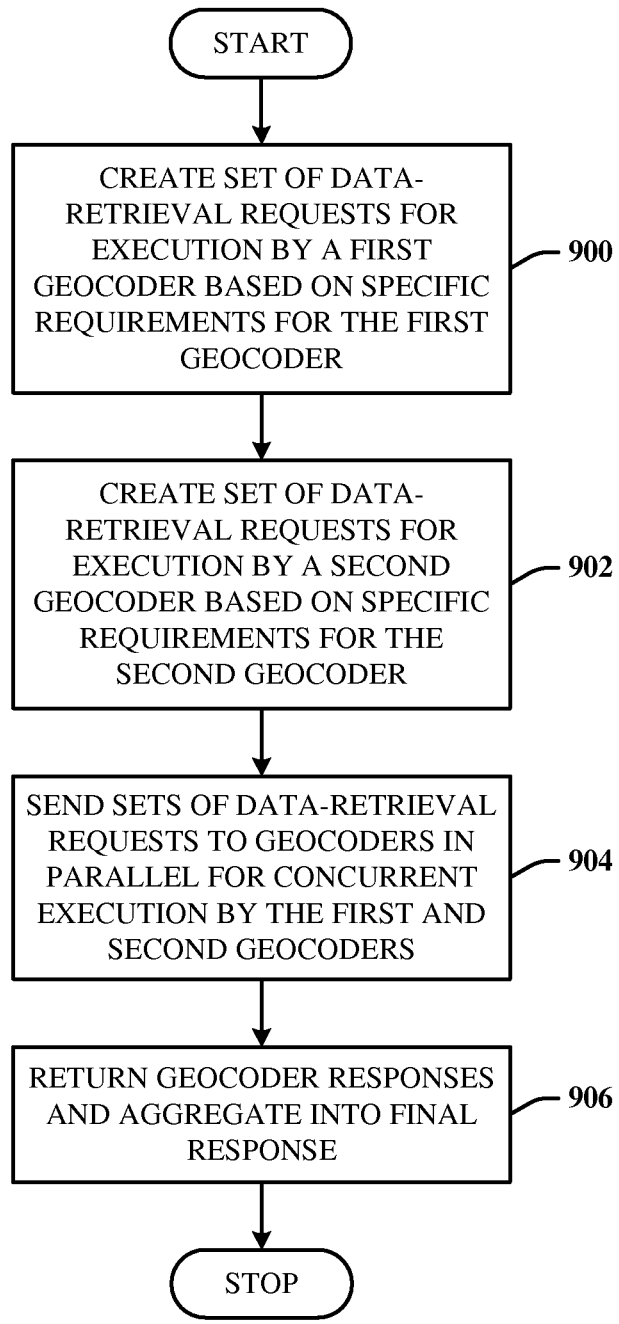
FIG. 9 illustrates a method of parallel execution of data-retrieval requests.

FIG. 9 illustrates a method of parallel execution of data-retrieval requests. At 900, a set of data-retrieval requests is created for a first geocoder based on specific requirements of the first geocoder. At 902, a set of data-retrieval requests is created for a second geocoder based on specific requirements of the second geocoder. At 904, the sets of requests are sent to the respective geocoders in parallel for concurrent execution by the first and second geocoders. At 906, the geocoder responses are returned and aggregated into a final response. Although described in the context of two geocoders, it is to be appreciated that there can be more than two geocoders from which to select and to perform concurrent execution.

Figure 10:
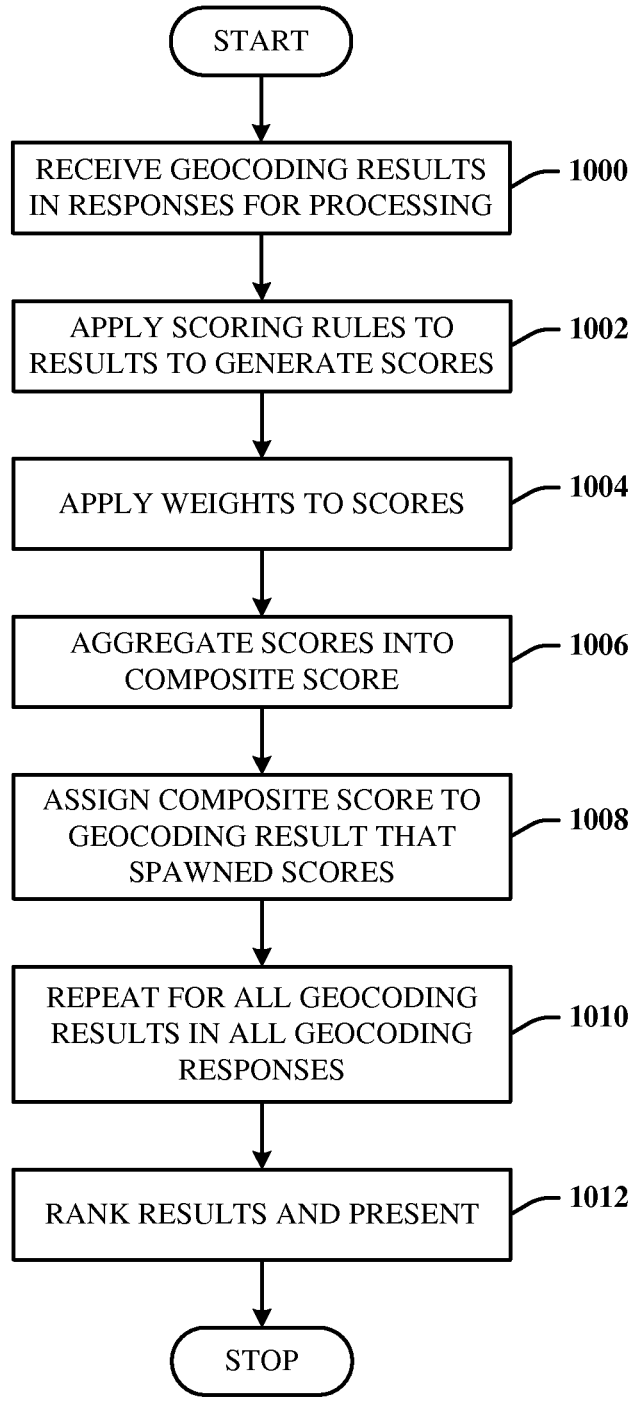
FIG. 10 illustrates a method of scoring and ranking in accordance with the geocoding architecture.

FIG. 10 illustrates a method of scoring and ranking in accordance with the geocoding architecture. At 1000, geocoding results are received in responses from the geocoders. At 1002, scoring rules are applied to the results to generate scores. At 1004, weights then can be applied to different scores. At 1006, the weighted scores are aggregated into a composite score. At 1008, the composite score is assigned to the geocoding result that spawned the scores. At 1010, this process is repeated for all geocoding results in all geocoding responses. At 1012, the results are then ranked for presentation.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
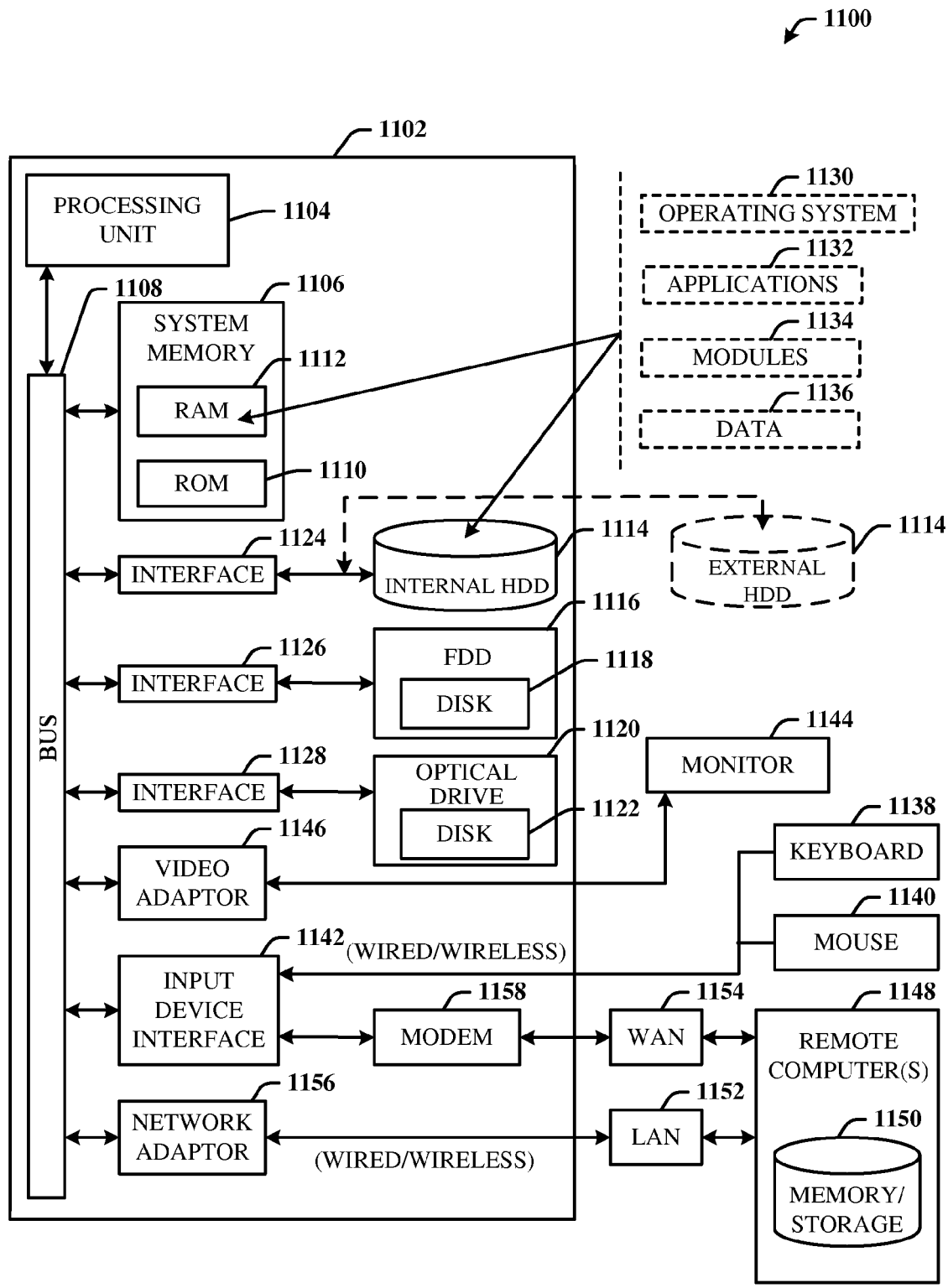
FIG. 11 illustrates a block diagram of a computing system operable to perform geocoding by information retrieval in accordance with the disclosed architecture.

Referring now to FIG. 11, there is illustrated a block diagram of a computing system 1100 operable to perform geocoding by information retrieval in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1134 and program data 1136. The one or more application programs 1132, other program modules 1134 and program data 1136 can include the components described herein, for example, the triage component 102, geocoding component 104, the geocoders 106, the results component 108, the geocoding engine 202, the query component 206, the parser 208, the classifier 210, the parallel execution component 212, the geocoding service 302, the geocoding manager 304, platform common components 306, the query optimizer component 402, the verifier component 404, the ranking component 602, the scoring component 604, the weighting component 606, and the scoring rules component 608, for example.

All or portions of the operating system, applications, modules, and/or data can also be cached in the RAM 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wire and/or wireless communication network interface or adapter 1156. The adaptor 1156 may facilitate wire or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 12:
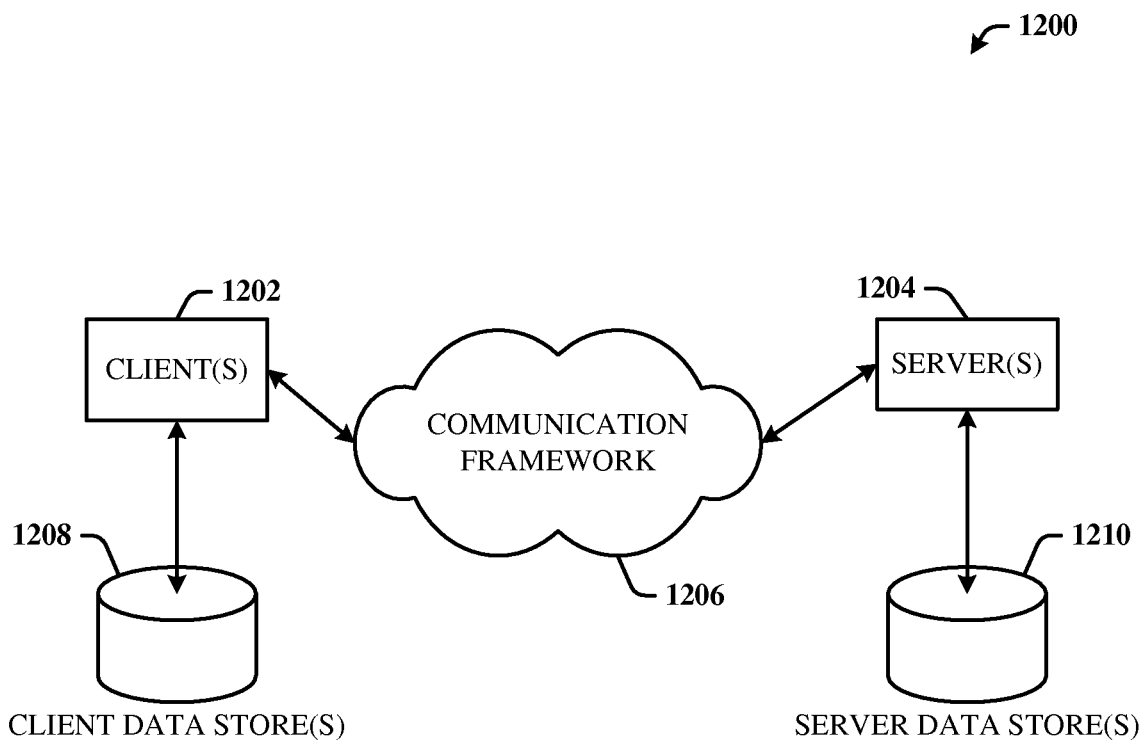
FIG. 12 illustrates a schematic block diagram of an exemplary computing environment that supports geocoding by information retrieval in accordance with the disclosed architecture.

Referring now to FIG. 12, there is illustrated a schematic block diagram of an exemplary computing environment 1200 that supports geocoding by information retrieval in accordance with the disclosed architecture. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The servers 1204 can include the system 100, engine 202, system 300, system 400, diagram 500, and diagram 600, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented geocoding system, comprising:
   a processor;
   a triage component executing on the processor and configured to perform steps including:
   receiving a query comprising a string and user context information, wherein the user context information includes at least one of market data, culture data, map view data and user location data, wherein the market data indicates a preferred geographical region, the culture data indicates a language setting, the map view data provides a geographic context of a current user view, and the user location data is based on a physical location of user;
   parsing the string into a set of data-retrieval requests by extracting geographical information to generate a list of ranked geographical information using a weighting function and validating an address from the geographical information, wherein each data retrieval request comprises user context information and fields of a valid address, and wherein the set of data-retrieval requests comprises more than one data-retrieval request for execution by geocoders;
   selecting a plurality of geocoders to which to send the set of data retrieval requests for execution based on specific requirements of each geocoder, wherein the specific requirements of a first geocoder are different from the specific requirements of a second geocoder, and the data retrieval requests sent to the first geocoder are different from the data retrieval requests send to the second geocoder; and
   using at least one data retrieval request in the set of data retrieval requests to generate a geocoding command specifically for each of the selected plurality of geocoders to consume, wherein the geocoding command of the first geocoder is different from the geocoding command of the second geocoder;
   a geocoding component executing on the processor and configured to perform steps including:
   aggregating the set of data-retrieval requests; and
   federating the set of data-retrieval requests and generated geocoding commands to the selected plurality of geocoders for parallel execution, wherein the selected plurality of geocoders return responses, wherein the responses comprise a set of results; and
   a results component executing on the processor and configured to perform steps including:
   processing the responses from the selected geocoders by merging the responses into a ranked list of results using predetermined scoring and ranking rules, and a subset of the results is returned.

2. The system of claim 1, wherein the string is part of a query of natural language text.

3. The system of claim 1, further comprising a query component executing on the processor and configured to perform steps including receiving the string in a query and adding context information to the string.

4. The system of claim 1, wherein the triage component executing on the processor and further configured to perform steps including performing a classification process on the string to obtain the more than one parse result.

5. The system of claim 4, wherein the classification process is based on machine learning.

6. The system of claim 1, wherein the results component executing on the processor and further configured to perform steps including generating scores for the results, and the results are ranked based on the scores.

7. The system of claim 1, wherein the results component executing on the processor and further configured to perform steps including normalizing static data-retrieval requests, and generates dynamic scores for the results based on multiple dimensions of relevance using at least one of context information, data-retrieval possibilities, the static data-retrieval requests, or user personalization.

8. A computer-implemented method of geocoding based on data retrieval, comprising:
receiving a query string accompanied by user context information, wherein the user context information includes at least one of: market data, culture data, map view data or user location data, wherein the market data indicates a preferred geographical region, the culture data indicates a language setting, the map view data provides a geographic context of a current user view, and the user location data is based on a physical location of user;
parsing the query string into a set of data-retrieval requests by extracting geographical information to generate a list of ranked geographical information using a weighting function and validating an address from the geographical information, wherein each data retrieval request comprises user context information and fields of a valid address, and wherein the set of data-retrieval requests comprises more than one data-retrieval request for execution by geocoders;
selecting a plurality of geocoders to which to send the set of data retrieval requests for execution based on specific requirements of each geocoder, wherein the specific requirements of a first geocoder are different from the specific requirements of a second geocoder, and the data retrieval requests sent to the first geocoder are different from the data retrieval requests send to the second geocoder; and
using at least one data retrieval request in the set of data retrieval requests to generate a geocoding command specifically for each of the selected plurality of geocoders to consume, wherein the geocoding command of the first geocoder is different from the geocoding command of the second geocoder;
aggregating the set of data-retrieval requests;
federating the set of data-retrieval requests and generated geocoding commands to the selected plurality of data geocoders for parallel execution, wherein the selected plurality of geocoders return responses, wherein the responses comprise a set of results;
merging the responses from the selected data geocoders into a ranked list of results using predetermined scoring and ranking rules; and
selecting a set of results from the ranked list of results and returning the set of results for processing.

9. The method of claim 8, wherein the query string is a structured string or an unstructured natural language string.

10. The method of claim 8, further comprising:
applying scoring rules to results in the responses to generate scores;
applying weights to the scores;
aggregating the scores into a composites score; and
assigning the composite score to a result that spawned the composite score.

11. The method of claim 8, further comprising optimizing the query string based on country and region.

12. The method of claim 8, further comprising ranking the results based on a static rank and a dynamic rank.

13. A computer-implemented system, comprising:
a processor;
computer-implemented means for receiving a query comprising a natural language string of text from a client;
computer-implemented means for adding user context information to the query, wherein the user context information includes at least one of: market data, culture data, map view data or user location data, wherein the market data indicates a preferred geographical region, the culture data indicates a language setting, the map view data provides a geographic context of a current user view, and the user location data is based on a physical location of user;
computer-implemented means for parsing the natural language string by the processor into more than one parse result;
computer-implemented means for creating a set of data-retrieval requests by extracting geographical information to generate a list of ranked geographical information using a weighting function and validating an address from the geographical information based on the more than one parse result, wherein each data retrieval request comprises the user context information and fields of a valid address, and wherein the set of data-retrieval requests comprising more than one data retrieval request for execution by geocoders;
computer-implemented means for selecting a plurality of geocoders to which to send the set of data retrieval requests for execution based on specific requirements of each geocoder, wherein the specific requirements of a first geocoder are different from the specific requirements of a second geocoder, and the data retrieval requests sent to the first geocoder are different from the data retrieval requests send to the second geocoder;
computer-implemented means for using at least one data retrieval request in the set of data retrieval requests to generate a geocoding command specifically for each of the selected plurality of geocoders to consume, wherein the geocoding command of the first geocoder is different from the geocoding command of the second geocoder;
computer-implemented means for federating the set of data-retrieval requests and generated geocoding commands to the selected plurality of data geocoders for parallel execution, wherein the selected plurality of geocoders return responses, wherein the responses comprise a set of results;
computer-implemented means for merging responses from the selected data geocoders into a ranked list of results using predetermined scoring and ranking rules; and
computer-implemented means for selecting a set of results from the ranked list of results and returning the set of results to the client.

* * * * *